United States Patent Office 3,413,534
Patented Nov. 26, 1968

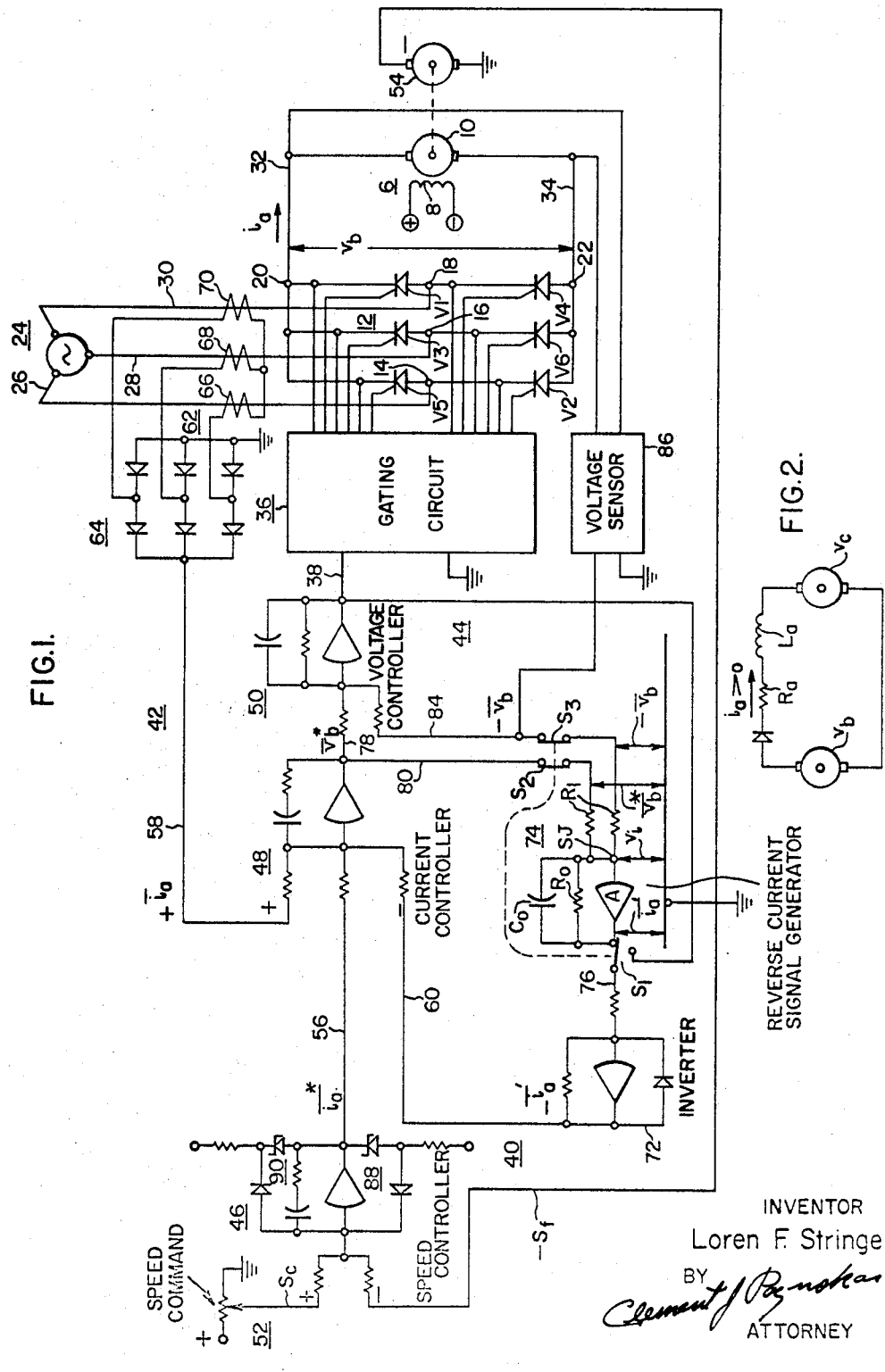

3,413,534
NON-REGENERATING DC MOTOR REGULATING CIRCUIT HAVING IMPROVED STABILITY
Loren F. Stringer, Clarence, Buffalo, N.Y., assignor to Westinghouse Electric Corporation, Pittsburgh, Pa., a corporation of Pennsylvania
Filed Mar. 14, 1966, Ser. No. 533,924
5 Claims. (Cl. 318—308)

This invention relates to direct current motor drives supplied from non-regenerating unidirectional power converters such as solid state controlled rectifiers. Speed regulated drives of this type employing a current regulating loop are subject to relaxation oscillations. When the actual motor speed is higher than the reference setting, the motor speed can be reduced only by the mechanical load on the motor. However, under light load conditions this takes place at a relatively slow rate and the resulting speed error can drive the power supply to cut-off. The speed must fall appreciably below the set point before the system is driven out of saturation. The speed must then be forced up to the set point from an unfavorable set of initial conditions. The result is a speed overshoot and the system is once again driven into a cut-off state. Sustained oscillations of a relaxation type can occur if the load is less than a critical value which depends on the dynamic characteristics of the system. As the load is further decreased the period of the oscillations will be increased. As the load is increased above the critical value, the oscillations will be damped out.

It is therefore an object of the present invention to add stability under light load conditions to a speed regulated non-regenerating DC motor drive system employing asymmetric power converters such as solid state controllable rectifiers.

In accordance with one embodiment of the invention stability is imparted to a speed regulated DC motor drive system having cascaded speed and current and armature voltage regulating loops by supplying to the current controller in addition to the speed error and armature current negative feedback signals, signal components proportional to the difference between the output of the current regulator and a signal representing the regulated voltage across the motor armature.

Other and further objects and advantages of the invention will become apparent from the following detailed description taken in connection with the drawings wherein a preferred embodiment of the invention is illustrated.

FIG. 1 is a circuit diagram of a direct current motor control system embodying the invention.

FIG. 2 shows the equivalent of the armature circuit when motoring.

Referring now to FIG. 1, a motor 6 has a field 8 and an armature 10. The field is supplied with power from a suitable DC source (not shown), and the armature is supplied with power from a non-regenerating DC source 12, for example the three phase bridge shown thereat. This bridge is provided with six asymmetric branches interconnected with AC (alternating current) input terminals 14, 16 and 18 and a pair of DC (direct current) output terminals 20 and 22 to form the bridge arrangement. Input terminals 14, 16 and 18 are connected to a suitable source 24 of three phase AC through lines 26, 28 and 30. The output terminals 20 and 22 are connected through lines 32 and 34 to the armature 10.

Each of the bridge branches has connected therein a controllable asymmetric valve, for example a solid state controlled rectifier, a popular form of which is the silicon controlled rectifier. These valves are indicated at V1, V2, V3, V4, V5 and V6, the numerical part of the reference character for each valve being the firing order of the valve. Each of the valves is provided with an anode A, a cathode K and a gate G.

Firing signals supplied by a gating or firing circuit 36 to the gate-cathode circuits of the valves V1 to V6, control the conduction times of these valves and thereby the voltage output of the bridge 12. Firing circuit 36 is any suitable type that will vary the position of the firing pulses to retard or advance the firing angle of the respective valves in response to and depending on the value of a control signal being received on a line 38 connected to the control input circuit of the firing circuit 36.

Line 38 is the output line of a regulating system that includes three cascaded regulating loops, a speed loop 40, an armature current loop 42 commanded by the speed loop, and an armature voltage loop 44 commanded by the current loop, the voltage loop providing the drive or demand signal on line 38 for the gating circuit 36. Each of the loops includes a controller which provides an output that is a function of the summation of input signals. More specifically, the speed loop is provided with a speed controller 46, the current loop is provided with a current controller 48 and the voltage loop is provided with a voltage controller 50. By way of example each of these controllers is shown as an operational amplifier with a summing input and appropriate feedback networks to provide the desired dynamic behavior of the system in the normal mode of operation.

A speed command or reference signal $S_c$ proportional to desired speed is supplied to the summing input of controller 46 from any suitable source of reference voltage for example an adjustable source 52 represented by the potentiometer shown thereat connected across a suitable source of power. Also applied to the input of the controller 46 is a negative feedback signal $S_f$ proportional to the actual speed of motor 6. The speed feedback signal $S_f$ is supplied by a tachometer generator 54 driven by motor 6. Controller 46 provides on an output line 56 a signal $$\overset{*}{\bar{i}_a}$$

which is a function of the difference between actual and commanded (desired) motor speeds.

Signal $$\overset{*}{\bar{i}_a}$$

on line 56 is applied as the armature current command signal to the summing input of current controller 48. When armature current $i_a$ flows, that is during motoring, an armature current negative feedback signal $$\bar{i}_a$$

is supplied along a line 58 to the input of controller 48. When the motor is generating, a reverse current negative feedback signal $$-\bar{i}_a{}'$$

representing (simulating) reverse current in the armature circuit which would flow if the system could regenerate, is applied to the input of current controller 48.

The motoring current negative feedback signal on line 58 is shown by way of example as supplied by a current sensing circuit 62 employing a three phase rectifier 64 supplied by the Y-connected secondaries of current transformers 66, 68 and 70 which sample the current in the AC input lines of rectifier 12. The output of rectifier 64 on line 58 is proportional to the motor armature current.

The bar ( ‾ ) used in certain of the signal symbols herein denotes scaled values of motor variables. The asterisk (*) used in connection with certain signal symbols denotes a command signal.

The reverse current negative feedback signal on line 60 is obtained through a unidirectional inverter 72 (for proper negative feedback polarity) from a reverse current generator 74 through a line 76 and a selector switch $S_1$ (in the position shown). The reverse current signal generator 74 may, for example, be an operational amplifier as shown with a delay $R_0C_0$ provided by the feedback network including resistor $R_0$ and capacitor $C_0$. Preferably, though not necessarily the delay $R_0C_0$ is arranged to be equal to $T_a$, the time constant of the motor armature circuit.

Current controller 48 produces an output signal $$\overline{v_b}^*$$

which is supplied as an armature voltage command signal along a line 78 to the summing input of the voltage controller 50. Signal $$\overline{v_b}^*$$

is also supplied through a line 80 and a switch $S_2$ (closed) to the summing input of the reverse current signal generator 74. The summing input of signal generator 74 is also supplied through a line 82 and a switch $S_3$ (closed) with a signal $$-\overline{v_b}$$

proportional to the voltage $v_b$ across the armature 10. Signal $$-\overline{v_b}$$

is also applied through a line 84 as an armature voltage negative feedback signal to the summing input of the voltage controller 50. Signal $$-\overline{v_b}$$

is obtained from a voltage sensor 86 connected across the armature 10. Voltage sensor 86 may, for example, be a DC output magnetic amplifier which also provides isolation between the motor and controller circuits.

Controllers 46 and 48 are shown by way of example, with feedback networks that usually give these controllers proportional-integral characteristics. Speed controller 46 is shown with output limiting circuits 88 and 90 for limiting both the reverse and the forward current command signals within the capabilities of the apparatus. Controllers 46, 48 and 50, and reverse current signal generator 74 are shown as inverting, bidirectional output summing amplifiers.

Operation of the inventive improvement herein may be better understood by considering the operation without the inventive improvement. Conventional prior art apparatus would normally include the system shown but without the reverse current signal generator 74 and its associated inverter 72.

Considering now the operation of the system without the reverse current signal generator 74. Assume that the speed command signal $S_c$ is a positive polarity and that the speed feedback signal $S_f$ is of negative polarity. When the desired or command speed is greater than the actual motor speed, the summation of the input signals to the speed controller 46 will be a net positive input signal. Since the amplifier 46 is an inverting amplifier, the output signal will be of negative polarity on line 56. Thus the forward (motoring) current command signal applied to the input of the current controller 48 is of negative polarity, and being greater than the negative current feedback signal (which is positive polarity), the output on line 78 will be a positive signal that is applied as a voltage command signal to the voltage controller 50. In turn, voltage controller 50 applies along line 38 a negative polarity signal, which for this example is assumed to be the proper polarity to drive the gating circuit 36 to increase the output voltage of the rectifier 12. As a consequence, the current feedback in line 58 and the armature voltage feedback in line 84 both increase until balances between current feedback and current command and between voltage feedback and voltage command occur. This situation poses no problem.

However, when the desired or command speed is below the actual motor speed, the net input to amplifier 46 is of negative polarity, and the output on line 56 is a positive polarity current command signal. Since the power supply is non-regenerating in character, there is no armature current negative feedback signal to balance against the current command signal applied to the input of the current controller 48. This tends to drive the armature power supply to cutoff, giving rise to relaxation oscillations from the system as previously described.

Now consider the operation of the complete system including the reverse current signal generator 74. Again, it is assumed that it requires an increasingly negative polarity signal on line 38 to drive the gating circuit 36 to increase the output voltage of rectifier 12. When the commanded speed is above actual speed, the speed controller 46 applies a current command signal of negative polarity to the current controller 48, which in turn applies along line 78 a voltage command signal of positive polarity to the voltage controller 50. In turn, voltage controller 50 applies along line 38 a negative polarity signal to drive the gating circuit in a manner to increase the output voltage of rectifier 12. Current negative feedback is applied through line 58 to controller 48, and armature voltage negative feedback is applied through line 84 to the input of the voltage controller 50, eventually forcing a match between the current command and the current feedback signals, and between the voltage command and the actual voltage feedback signals. Until equilibrium is reached, the voltage command signal $$\overline{v_b}^*$$

being of positive polarity and greater than the armature voltage feedback signal $$-\overline{v_b}$$

which is of negative polarity, the net input to the reverse current signal generator 74 is positive polarity as it is to the input of the voltage controller 50. As a result the output signal $$\overline{i_a}'$$

of the reverse current signal generator on line 76 is of negative polarity. However, amplifier 72 is unidirectional and although it is an inverter it will not produce a positive output signal or for that matter any signal in response to a negative input. Thus there will be no signal on line 60.

When the commanded speed is below the actual motor speed, the speed controller applies a current command signal of positive polarity to the current controller 48 which in turn applies along line 78 a voltage command signal of negative polarity to the voltage controller 50, thereby to provide a positive signal on line 38 to drive the gating circuit 36 in a direction to reduce the output voltage of rectifier 12 to substantially cutoff. Under these circumstances since the system is non-regenerative there will be no current feedback signal on line 58, and the armature voltage $v_b$ will now substantially be the counter EMF of the armature. Because of the polarities of the voltage command signal $$\overline{v_b}^*$$

and the voltage feedback signal $$-\overline{v_b}$$

the net input into the reverse current signal generator 74 will be of negative polarity to provide on the output line 76 a signal $$\overline{i_a}'$$

of positive polarity. This signal applied to the input of the inverting amplifier 72 will produce on line 60 a negative polarity signal $$-\overline{i_a}'$$

to balance against the positive polarity current command signal $$\overset{*}{\overline{i_a}}$$

on line 56. Thus, the proper initial conditions are established and equilibrium is reached smoothly for any commanded speed without sustained oscillations. The dynamic behavior of the system in the forward direction can be optimized without compromise.

It should be noted that without the armature voltage controller 50 and its associated voltage regulating loop 44, the command signal $$\overset{*}{\overline{v_b}}$$

and the armature voltage feedback signal $$\overline{v_b}$$

cannot be forced to balance or approach each other. As a consequence, the reverse current signal generator alone (i.e. without regulated armature voltage signal) cannot fully suppress the undesirable relaxation oscillations in the system.

The following comparative analysis of the reverse current signal generator 74 and the motor armature circuit may be helpful to a better understanding of why the reverse current signal generator provides an appropriate current feedback signal when the motor is free-wheeling.

Referring first to FIG. 2, which shows the equivalent of the armature circuit when motoring (command speed>than actual speed), $R_a$ is the armature circuit resistance, $L_a$ is the armature circuit inductance, $v_b$ is the DC bus voltage (across lines 32–34), $v_c$ is the armature CEMF (counterelectromotive force), and $i_a$ is the motoring armature current.

Under motoring conditions $$v_b = v_c + R_a i_a + L_a \frac{di_a}{dt}$$

$$v_b - v_c = R_a i_a \left(1 + \frac{L_a}{R_a} P\right)$$

where $L_a/R_a = T_a =$ time constant armature circuit; $P \equiv d/dt$.

Hence $$R_a i_a = \frac{v_b - v_c}{1 + T_a P}$$

$$\frac{R_a i_a}{V} = \frac{\frac{v_b}{V} - \frac{v_c}{V}}{1 + T_a P}$$

where $V \equiv$ scale factor to place variables in per-unit form and $$\overline{i_a} = \frac{R_a i_a}{V}; \quad \overset{*}{\overline{v_b}} = \frac{v_b}{V}; \quad \overline{v_c} = \frac{v_c}{V}$$

$$\overline{i_a} = \frac{\overline{v_b} - \overline{v_c}}{1 + T_a P} \geq 0$$

because of rectifier action.

Because of voltage controller $$\overline{v_b} \cong \overset{*}{\overline{v_b}}$$

$$\therefore \overline{i_a} \cong \frac{\overset{*}{\overline{v_b}} - \overline{v_c}}{1 + T_a P}$$

Considering now the reverse current signal generator 74 when the motor is generating (command speed<than actual motor speed).

$$\overline{i_a}' = -A v_i$$

(note $$\overline{i_a}'$$

is actually a voltage) If $A \gg 1$ implies that $v_i \approx 0$ $$\frac{\overset{*}{\overline{v_b}}}{R_1} + \frac{-\overline{v_b}}{R_1} + \frac{\overline{i_a}'}{R_0} + C_0 \frac{d}{dt} \overline{i_a}' = 0$$

Since sum of currents into SJ must be 0

$$-\frac{R_0}{R_1}\left(\overset{*}{\overline{v_b}} - \overline{v_b}\right) = \overline{i_a}'(1 + R_0 C_0 P)$$

$$\frac{R_0}{R_1} = 1 \qquad R_0 C_0 = Ta$$

$$\overline{i_a}' = \frac{\overset{*}{\overline{v_b}} - \overline{v_b}}{(1 + T_a P)}$$

Since $$i_a = 0, \ v_b = v_c \text{ and } \overline{v_b} = \overline{v_c}$$

$$\therefore \overline{i_a}' = \frac{\overline{v_c} - \overset{*}{\overline{v_b}}}{1 + T_a P}$$

The foregoing analysis also provides a better understanding of the need for the joint teamwork of the voltage controller 50 and the reverse current signal generator 74 in bringing the system to equilibrium smoothly when the actual motor speed has been higher than the commanded speed. From the above analysis of the reverse current signal generator 74, it is also seen that the output $$\overline{i_a}'$$

of this generator is a function of the summation of the armature voltage command signal and the armature voltage feedback signal, modified by a delay $R_0 C_0$ equal to the armature circuit time delay. However, while a close approximation of this delay insures greater accuracy and stability, it is not critical, as there will be some benefit even if this delay value is departed from. In this connection it may be noted that the delay in voltage controller 50 which is required to stabilize the voltage regulating loop 44 will usually be not far from the value of the armature circuit time constant. For this reason, and because the inputs to the voltage controller 50 and the reverse current signal generator are the same, the input to amplifier 72 can be connected directly to the output line 38 and the function of the generator 74 will be performed by the voltage controller 50, thus eliminating one operational amplifier (generator 74). Such a circuit without generator 74 may be effected by switching the input line of amplifier 72 directly to line 38 (switch $S_1$), and opening switches $S_2$ and $S_3$.

It is to be understood that the herein described arrangements are simply illustrative of the principles of the invention, and that other embodiments and applications are within the spirit and scope of the invention.

I claim as my invention:

1. In a system for regulating the speed of a DC motor having a field and an armature, a controllable non-regenerating DC supply source connected to supply said armature, means for providing a first signal that is a function of the difference between actual and desired speeds of the motor, means for providing a second signal that is a function of the actual voltage across said armature, current controller means for producing in response to signals applied to its input a third signal representing desired voltage across said armature, voltage controller means responsive to said second and third signals for producing a fourth signal which is a function of the difference between desired and actual armature voltages, means for controlling said DC supply source in response to said fourth signal, means for applying said first signal to the input of said current controller means, means for supplying to the input of said current controller means in negative feedback relation to said first signal a signal component that is a function of armature current when the motor is motoring, and eighth means for supplying to the input of said current controller means in negative feedback relation to said first signal a signal component that is a function of the difference between desired and actual armature voltages.

2. The combination as in claim 1 wherein said eighth means comprises means coupling the output of said voltage controller means to the input of said current controller means.

3. The combination as in claim 1 wherein said eighth means comprises an operational amplifier having a delay of the order of the time constant of the armature.

4. The combination as in claim 1 wherein at least one of said armature controller means and voltage controller means is a summing operational amplifier which provides an integration component in its output.

5. The combination as in claim 1 wherein said controllable DC supply source includes an AC to DC rectifier employing controllable electric valves for performing the rectifying function, and wherein said means for controlling said DC supply source comprises means for controlling the conduction times of said valves as a function of said fourth signal.

No references cited.

ORIS L. RADER, *Primary Examiner.*

J. J. BAKER, *Assistant Examiner.*